US011165580B2

(12) United States Patent
Kvochko et al.

(10) Patent No.: US 11,165,580 B2
(45) Date of Patent: Nov. 2, 2021

(54) ENCRYPTED DATA TRANSMISSION SYSTEM FOR SECURE RESOURCE DISTRIBUTION

(71) Applicant: Bank of America Corporation, Charlotte, NC (US)

(72) Inventors: Elena Kvochko, New York, NY (US); Lalit Dhawan, Franklin Park, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 133 days.

(21) Appl. No.: 16/695,447

(22) Filed: Nov. 26, 2019

(65) Prior Publication Data

US 2021/0160071 A1 May 27, 2021

(51) Int. Cl.
*H04L 9/32* (2006.01)
*G06F 21/62* (2013.01)
*H04L 9/06* (2006.01)

(52) U.S. Cl.
CPC ........ *H04L 9/3213* (2013.01); *G06F 21/6263* (2013.01); *H04L 9/0643* (2013.01); *H04L 9/3228* (2013.01)

(58) Field of Classification Search
None
See application file for complete search history.

(56) References Cited

U.S. PATENT DOCUMENTS

| 7,254,560 | B2 | 8/2007 | Singhal | |
|---|---|---|---|---|
| 2007/0055937 | A1* | 3/2007 | Cancel | G06Q 30/00 715/704 |
| 2007/0244811 | A1 | 10/2007 | Tumminaro | |
| 2007/0255652 | A1 | 11/2007 | Tumminaro et al. | |
| 2007/0255653 | A1 | 11/2007 | Tumminaro et al. | |
| 2009/0319425 | A1 | 12/2009 | Tumminaro et al. | |
| 2010/0153853 | A1 | 6/2010 | Dawes et al. | |
| 2011/0102171 | A1 | 5/2011 | Raji et al. | |
| 2011/0320347 | A1 | 12/2011 | Tumminaro et al. | |
| 2012/0084205 | A1 | 4/2012 | Dheer et al. | |
| 2013/0036023 | A1 | 2/2013 | Koplovitz et al. | |
| 2013/0055357 | A1* | 2/2013 | Etchegoyen | G06F 21/34 726/4 |

(Continued)

*Primary Examiner* — William J. Goodchild

(74) *Attorney, Agent, or Firm* — Michael A. Springs; Moore & Van Allen PLLC; R. W. McCord Rayburn

(57) ABSTRACT

A privacy-enabled system for securely transmitting encrypted data is provided. The system comprises: a memory device with computer-readable program code stored thereon; a communication device connected to a network; and a processing device configured to: receive a request for a resource transfer of a resource from a user resource location associated with a user to a destination device associated with a third party; determine a data requirement for completing the resource transfer, wherein the data requirement is a minimum amount of user resource location data required for directing the resource from the user resource location to the destination device and completing the resource transfer; based on determining the data requirement, generate a transmission package comprising the resource, wherein the transmission package has at least a portion of the user resource location data removed or modified; and deliver the transmission package to the destination device to complete the resource transfer.

20 Claims, 6 Drawing Sheets

(56) References Cited

U.S. PATENT DOCUMENTS

2013/0081122 A1\* 3/2013 Svigals ................ H04L 9/3231
726/7
2014/0143139 A1 5/2014 Koplovitz et al.

\* cited by examiner

ENCRYPTED DATA TRANSMISSION SYSTEM FOR SECURE RESOURCE DISTRIBUTION

BACKGROUND

With growing user-awareness of the potential for personal data exposure, data security and privacy have become essential features to device users. Data is typically transferred or exchanged between devices during most interactions such as resource transfers between devices. As such, users desire to be able to decide exactly what data about them is transferred and processed in a trusted context. That said, users typically have limited means for controlling dissemination of their own personal data to outside entities. There is a need for increased data security and improved data governance from the user's perspective. While data protection regulations are beginning to broadly address the issue of data privacy, currently, new systems that have privacy by design are required to achieve these goals. Therefore, there exists a need for an improved, privacy-enabled data transmission system for generating and executing secure resource transfers and distribution while limiting data exposure.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A privacy-enabled system for securely transmitting encrypted data is provided. The system comprising: a memory device with computer-readable program code stored thereon; a communication device connected to a network; and a processing device, wherein the processing device is configured to execute the computer-readable program code to: receive a request for a resource transfer of a resource from a user resource location associated with a user to a destination device associated with a third party; determine a data requirement for completing the resource transfer, wherein the data requirement is a minimum amount of user resource location data required for directing the resource from the user resource location to the destination device and completing the resource transfer; based on determining the data requirement, generate a transmission package comprising the resource, wherein the transmission package has at least a portion of the user resource location data removed or modified; and deliver the transmission package to the destination device to complete the resource transfer.

In a particular embodiment, the user resource location and the user are associated with a user device, the user device having an interactive user application stored therein, and wherein the processing device is further configured to execute the computer-readable program code to: receive from the user, via the interactive user application, a selection of redacted data from the user resource location data to be removed from or modified in the transmission package.

In another embodiment, the system further comprises an intermediary resource location, wherein the processing device is further configured to execute the computer-readable program code to: determine whether the transmission package comprising the selection of redacted data meets the data requirement; and based on determining that the transmission package does not meet the data requirement, complete the resource transfer on behalf of the user, wherein the resource transfer is directed through the intermediary resource location to the destination device. In yet another embodiment, the user resource location data is not transmitted from the intermediary resource location to the destination device.

In yet another embodiment, generating the transmission package further comprises generating a unique identifier for the user resource location to at least partially mask the user resource location data from the destination device, and wherein the unique identifier is configured to be provided to the destination device with the resource to complete the resource transfer.

In yet another embodiment, the processing device is further configured to execute the computer-readable program code to: receive an authentication request from the destination device after delivery of the transmission package, the authentication request comprising the unique identifier; in response to receiving the authentication request, transmit an actionable notification to a user device associated with the user resource location, the actionable notification configured to receive confirmation input from the user via a user application for the resource transfer; and verify the authentication request based on receiving the confirmation input from the user, wherein verifying the authentication request completes the resource transfer.

In yet another embodiment, the unique identifier is a one-time use token configured to only be used to complete the resource transfer. In yet another embodiment, the system further comprises an encryption function stored in the memory device, the encryption function being configured to generate the unique identifier as an encrypted or hashed output.

A computer program product for securely transmitting encrypted data is also provided. The computer program product comprises a non-transitory computer-readable medium comprising computer-readable instructions, the computer-readable instructions, when executed by a processing device, cause the processing device to: receive a request for a resource transfer of a resource from a user resource location associated with a user to a destination device associated with a third party; determine a data requirement for completing the resource transfer, wherein the data requirement is a minimum amount of user resource location data required for directing the resource from the user resource location to the destination device and completing the resource transfer; based on determining the data requirement, generate a transmission package comprising the resource, wherein the transmission package has at least a portion of the user resource location data removed or modified; and deliver the transmission package to the destination device to complete the resource transfer.

In a particular embodiment, the user resource location and the user are associated with a user device, the user device having an interactive user application stored therein, and wherein the computer-readable instructions, when executed by the processing device, further cause the processing device to: receive from the user, via the interactive user application, a selection of redacted data from the user resource location data to be removed from or modified in the transmission package.

In another embodiment, the computer program product further comprises an intermediary resource location, wherein the computer-readable instructions, when executed by the processing device, further cause the processing device to: determine whether the transmission package comprising the selection of redacted data meets the data requirement; and based on determining that the transmission package does not meet the data requirement, complete the resource transfer on behalf of the user, wherein the resource transfer is directed through the intermediary resource location to the destination device. In yet another embodiment, the user resource location data is not transmitted from the intermediary resource location to the destination device.

In yet another embodiment, generating the transmission package further comprises generating a unique identifier for the user resource location to at least partially mask the user resource location data from the destination device, and wherein the unique identifier is configured to be provided to the destination device with the resource to complete the resource transfer.

In yet another embodiment, the computer-readable instructions, when executed by the processing device, further cause the processing device to: receive an authentication request from the destination device after delivery of the transmission package, the authentication request comprising the unique identifier; in response to receiving the authentication request, transmit an actionable notification to a user device associated with the user resource location, the actionable notification configured to receive confirmation input from the user via a user application for the resource transfer; and verify the authentication request based on receiving the confirmation input from the user, wherein verifying the authentication request completes the resource transfer.

In yet another embodiment, the unique identifier is a one-time use token configured to only be used to complete the resource transfer. In yet another embodiment, the computer program product further comprises an encryption function stored in a memory, the encryption function being configured to generate the unique identifier as an encrypted or hashed output.

A computer-implemented method for securely transmitting encrypted data is also provided. The computer-implemented method comprising: receiving a request for a resource transfer of a resource from a user resource location associated with a user to a destination device associated with a third party; determining a data requirement for completing the resource transfer, wherein the data requirement is a minimum amount of user resource location data required for directing the resource from the user resource location to the destination device and completing the resource transfer; based on determining the data requirement, generating a transmission package comprising the resource, wherein the transmission package has at least a portion of the user resource location data removed or modified; and delivering the transmission package to the destination device to complete the resource transfer.

In one particular embodiment, the user resource location and the user are associated with a user device, the user device having an interactive user application stored therein, the computer-implemented method further comprising: receiving from the user, via the interactive user application, a selection of redacted data from the user resource location data to be removed from or modified in the transmission package.

In another embodiment, the computer-implemented method further comprises: determining whether the transmission package comprising the selection of redacted data meets the data requirement; and based on determining that the transmission package does not meet the data requirement, completing the resource transfer on behalf of the user, wherein the resource transfer is directed through an intermediary resource location to the destination device. In yet another embodiment, the user resource location data is not transmitted from the intermediary resource location to the destination device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
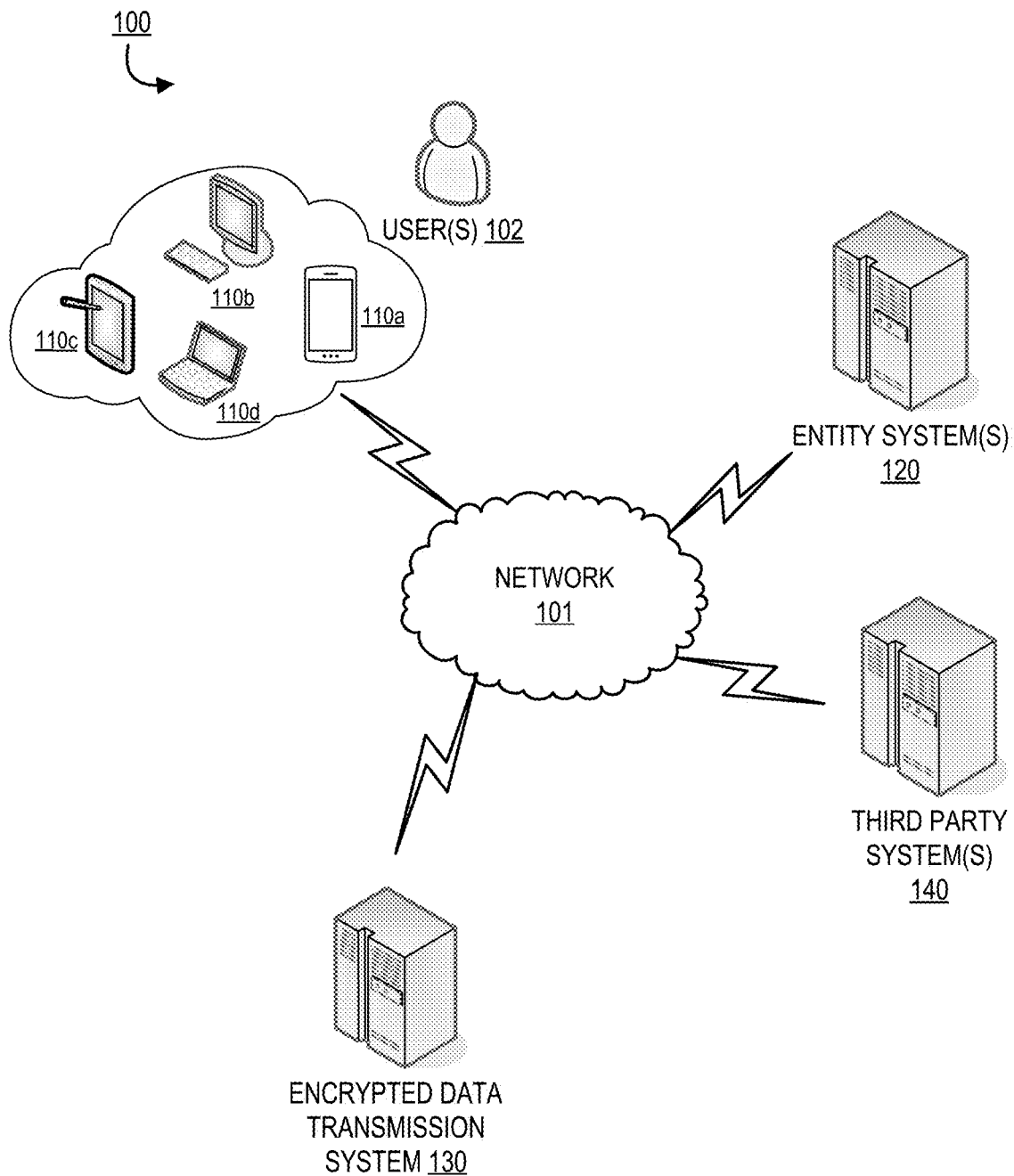
Figure 2:
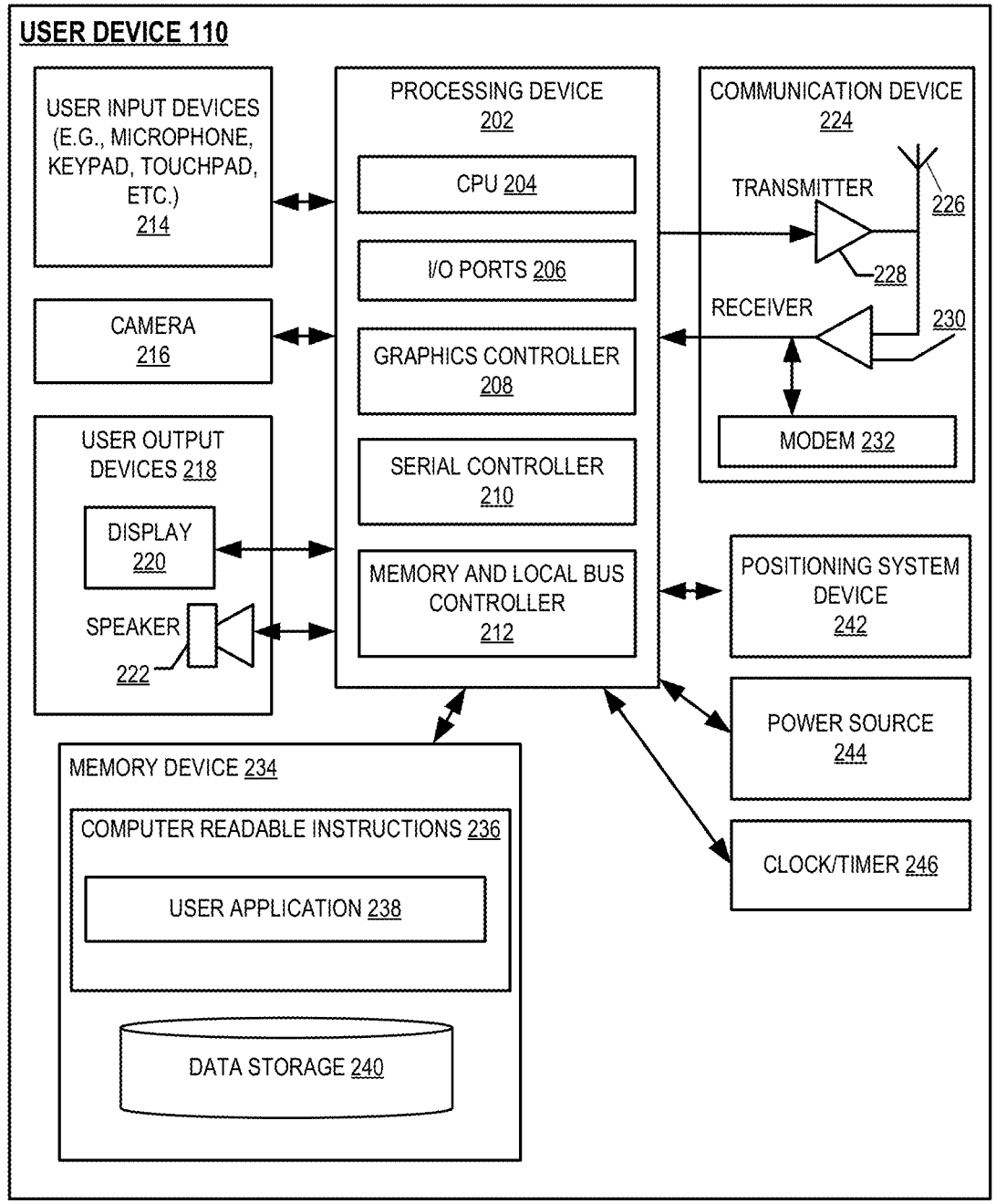
Figure 3:
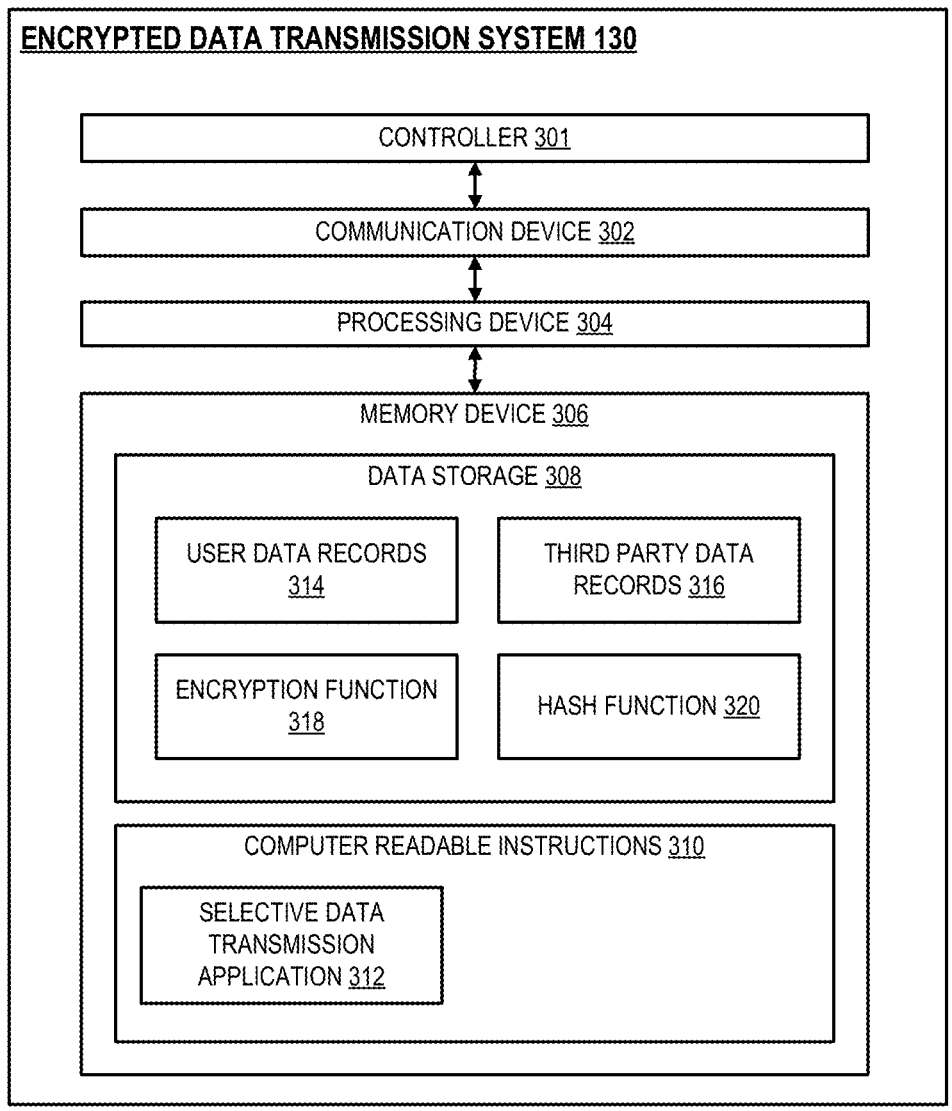
Figure 4:
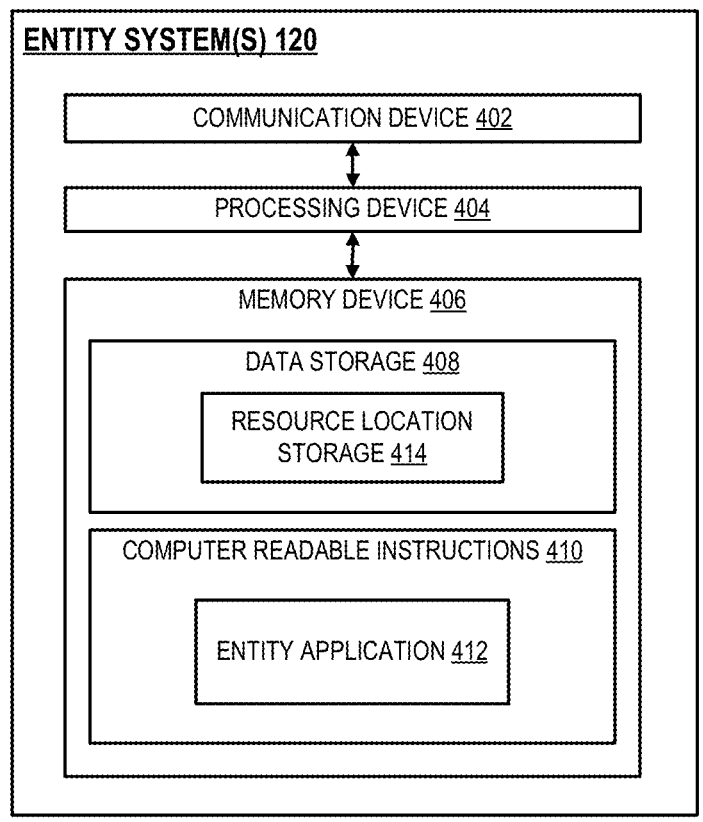
Figure 5:
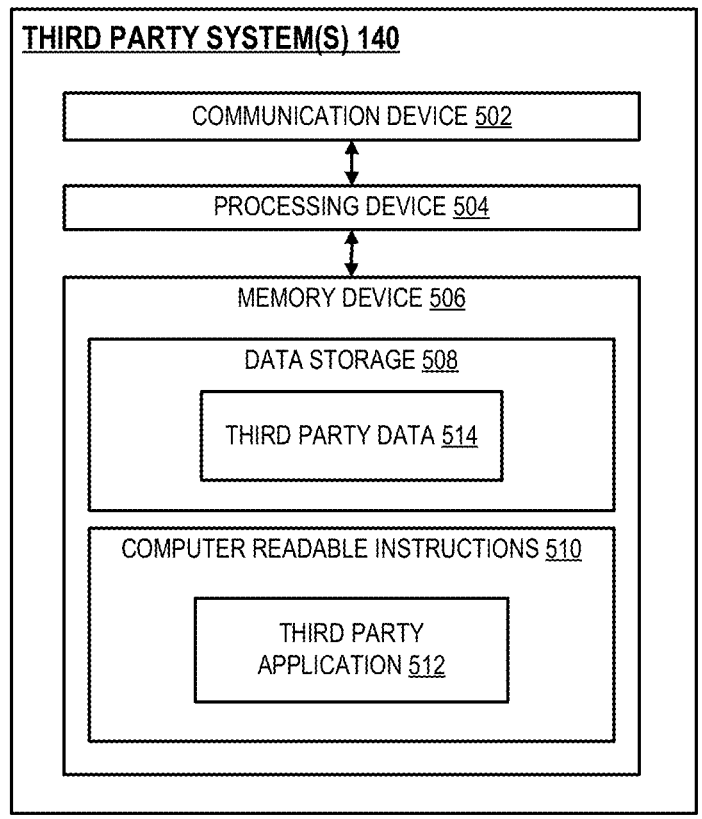
Figure 6:
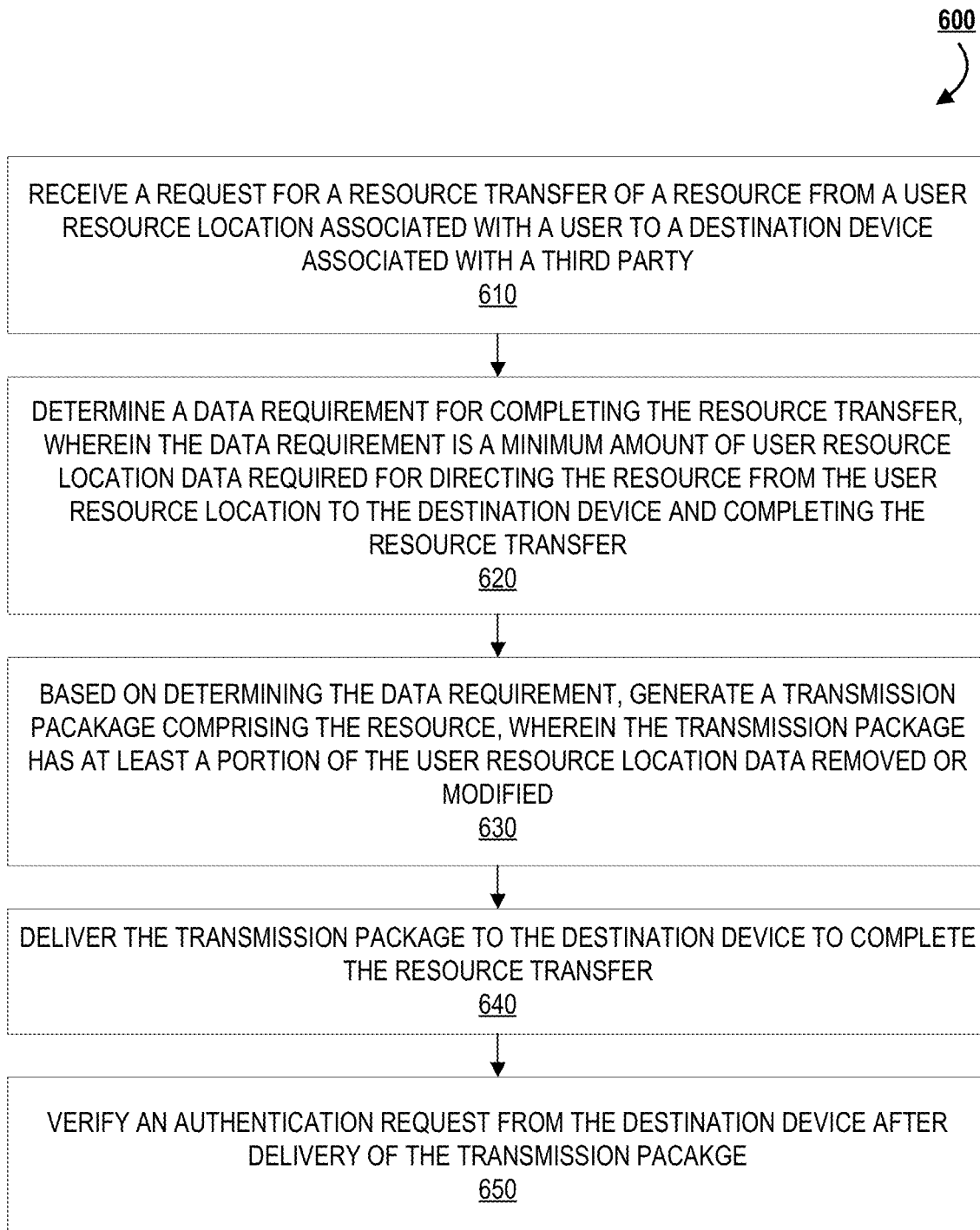

Having thus described embodiments of the invention in general terms, reference will now be made to the accompanying drawings, wherein:

FIG. 1 provides an encrypted data transmission system environment, in accordance with one embodiment of the invention;

FIG. 2 provides a block diagram of a user device, in accordance with one embodiment of the invention;

FIG. 3 provides a block diagram of an encrypted data transmission system, in accordance with one embodiment of the invention;

FIG. 4 provides a block diagram of an entity system, in accordance with one embodiment of the invention;

FIG. 5 provides a block diagram of a third party system, in accordance with one embodiment of the invention; and FIG. 6 provides a high level process flow for generating a secure data tranmission, in accordance with one embodiment of the invention.

DETAILED DESCRIPTION OF EMBODIMENTS OF THE INVENTION

Embodiments of the invention, as described herein, leverage complex, specific-use computer system to provide a novel approach for encrypted data transmissions for secure resource distributions. The system of the present invention is configured to provide a platform for selective data transmission, wherein the system generates a customized data transmission package comprising a minimum amount of data required to complete a resource transfer between devices. After receiving an initial resource transfer request, the system first determines an amount of data required to complete the resource transfers. The system then removes or otherwise modifies or obfuscates portions of the data transmitted to a destination device, wherein only the required data is transferred thereby enabling completion of the resource transfer. In some embodiments, removing or modifying portions of the data may include transforming portions of the data using encryption methods or a hash function. In a specific embodiment, the system may be configured to employ an additional, intermediary resource location to facilitate the resource transfer if the data requirements are not able to be met by either device.

In contrast, conventional resource transfer systems for completing resource transfers between parties typically transmit or make available unnecessary amounts of extraneous data along with the resource transferred between the devices or systems or the parties. That said, this data may include personal, private, or secure identifying data that a user may prefer to remain secure and/or private while limiting exposure. What is more, this data is typically stored and maintained by the receiving device or party further increasing potential exposure over time. As resource transfers are routinely required to be completed with unfamiliar and sometimes unknown and/or non-trusted third parties, there exists a need to limit exposure of potentially valuable and/or private data. Alternatively, the present invention provides a non-conventional solution to this technological problem. The present invention instead removes or modifies any data that a user does not want exposed from a resource transfer and generates a data transmission package comprising only the minimum data required. Furthermore, in some embodiments where the user does not wish to expose even the minimum data requirement (e.g., a resource transfer with a non-trusted third party), the system may complete the resource transfer on behalf of the user by incorporating a trusted, intermediary resource location maintained by the system to facilitate and complete the transfer. In this way, the system improves data security of resource transfers and data transmissions by addressing a problem inherent to the technology. Furthermore, by removing, modifying, or otherwise transforming (i.e., hashing) the transmitted data, the system may also reduce the amount of data that is transmitted thereby reducing required computing resources required for the transfer and improving operation of the systems involved by reducing the transmission time.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the encrypted data transmission system. In some embodiments, a user may be a computing device user, a phone user, a mobile device application user, a customer of an entity or business, a system operator, and/or employee of an entity (e.g., a financial institution). In a specific embodiment, a user is a customer or entity requesting a resource transfer to or from another party to complete an interaction. In one embodiment, a user may be a merchant or business owner who is a customer of a software providing entity such as an entity providing the encrypted data transmission system as a product or service. In another embodiment, a user may be an employee of an entity that provides resource transfer data transmission as a service to requesting parties. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), entertainment devices, automated teller machines (ATMs), or any combination of the aforementioned. The device may be used by the user to access the system directly or through an application, online portal, internet browser, virtual private network, or other connection channel. In one embodiment, a user device may comprise a point-of-sale device used to complete an interaction.

As used herein, the term "entity" may be used to include any organization or collection of users that may interact with the encrypted data transmission system. An entity may refer to a business, company, or other organization that either maintains or operates the system or requests use and accesses the system. In one embodiment, an entity may be a third party entity requesting a resource transfer with another party. In a specific embodiment, the entity may be associated with a financial institution. The terms "financial institution" and "financial entity" may be used to include any organization that processes financial transactions including, but not limited to, banks, credit unions, savings and loan associations, investment companies, stock brokerages, management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, drag-and-drop, toggling, text or data entry, etc.), authentication actions (e.g., signing-in, username and password entry, PIN entry, etc.), account actions or events (e.g., account access, resource transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transaction, exchange, or transmission of resources (e.g., funds or data (i.e., files)) between devices either directly or via an intermediate system (e.g., an entity system and/or the encrypted data transmission system described below). In another embodiment, an interaction may comprise an upload or transfer of data and/or another resource.

FIG. 1 provides an encrypted data transmission system environment 100, in accordance with one embodiment of the invention. As illustrated in FIG. 1, encrypted data transmission system 130 is operatively coupled, via a network 101, to the user device(s) 110 (e.g., a plurality of user devices 110a-110d), the entity system(s) 120, and third party system (s) 140. In this way, the encrypted data transmission system 130 can send information to and receive information from the user device 110, the entity system 120 and the third party system 140. In the illustrated embodiment, the plurality of user devices 110a-110d provide a plurality of communication channels through which the entity system 120, third party system 140, and/or the encrypted data transmission system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120, third party systems 140, and/or other user devices via a user device 110 while a data stream or flow between the user device 110 and the entity system 120 and/or other user devices is intercepted and monitored by the encrypted data transmission system 130 over the network 101. In some embodiments a user 102 is a user requesting service from the entity or interacting with an account maintained by the entity system 120. In an alternative embodiment, the user 102 is an individual interacting with the encrypted data transmission system 130 over the network 101 and monitoring input of information from the entity systems 120 and/or third party systems 140 to and from the encrypted data transmission system 130 for processing and analysis (e.g., an employee of the entity operating and/or monitoring the systems 120, 130). In an alternative example, the interaction may be processed through another system such as entity system 120 and/or encrypted data transmission system 130. In one embodiment, the user 102 is a third party customer such as a merchant or a business owner associated with the third party systems 140, wherein a resource transfer is requested by the third party and/or another user.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device like a GPS device, an accelerometer, and the like. In one embodiment, the camera 216 may include a scanner, barcode reader, or any other image capturing device or sensor configured to capture an image. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120, encrypted data transmission system 130, and/or third party system 140. In one embodiment, the user application 238 may be configured to allow a user 102 to request, initiate, and/or receive an interaction (e.g., a resource transfer) with another device or system. In some embodiments, a user application 238 may be configured to allow a user to interact with the encrypted data transmission system 130 to selectively transmit data to another device or system to complete a resource transfer.

The processing device 202 may be configured to use the communication device 224 to communicate with one or more other devices on a network 101 such as, but not limited to the entity system 120 and the encrypted data transmission system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, and/or fourth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or other wireless communication protocols. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238 are loaded into the temporary memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of an encrypted data transmission system 130, in accordance with one embodiment of the invention. The encrypted data transmission system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, the third party system 140, and/or the encrypted data transmission system 130, in order to interface and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110, the entity system 120, and the third party system 140. As such, the communication device 302 generally comprises a modem, server, or other device for communicating with other devices on the network 101.

As further illustrated in FIG. 3, the encrypted data transmission system 130 comprises computer-readable instructions 310 stored in the memory device 306, which in one embodiment includes the computer-readable instructions 310 of a selective data transmission application 312. In an alternative embodiment, the selective data transmission application 312 may be installed on another device such as directly on a user device 110. The selective data transmission application 312 may be configured to determine data requirements for a received resource transfer request and subsequently generate a data transmission package comprising the requested resource and any data selected to be included with the transfer.

In some embodiments, the memory device 306 includes data storage 308 for storing data related to the system environment, but not limited to data created and/or used by the selective data transmission application 312. Data stored in the data storage 308 may comprise one or more user data records 314, third party data records 316, an encryption function 318, and a hash function 320. The user data records 314 may comprise data associated with one or more users associated with the encrypted data transmission system 130 and/or an entity maintaining said system. The user data records 314 may further include data associated with one or more user resource locations or resource accounts. Similarly, the third party data records 316 may comprise data associated with one or more third party entities or users associated with the encrypted data transmission system 130 and/or an entity maintaining said system. The third party data records 316 may further include data associated with one or more user resource locations or resource accounts. In one embodiment, the third party data records 316 include a record of historical interactions associated with a third party. In yet another embodiment, the third party data records 316 include a record of misappropriation data and/or data exposure associated with the third party, wherein a third party may be indicated as being a trusted party or a non-trusted party depending on the record. The encryption function 318 may comprise a function configured for transforming data from a first form to a second encrypted form. Examples of encryption functions may include public-private key generators, data mask generators, or the like. The hash function 320 comprises a function configured to map data of a first size to a second fixed sized value that is typically smaller than the first size. The hash function may include one or more keys, tables, or the like for transforming and reading the data in a hashed format.

In one embodiment of the invention, the encrypted data transmission system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the encrypted data transmission system 130 may include multiple systems, servers, computers or the like maintained by one or many entities. In some embodiments, the encrypted data transmission system 130 may be part of the entity systems 120. In other embodiments, the entity systems 120 are distinct from the encrypted data transmission system 130. The encrypted data transmission system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110 and the encrypted data transmission system 130. The entity systems 120 may be associated with one or more entities, institutions or the like, such as an entity maintaining the encrypted data transmission system 130. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the encrypted data transmission system 130 to provide access to accounts (i.e., resource locations), resources, data (e.g., application modules 414) stored and maintained on the entity systems 120. In some embodiments, the entity system 120 may communicate with the encrypted data transmission system 130 during an interaction with a user 102 in real-time, wherein user interactions may be monitored and processed by the encrypted data transmission system 130. In some embodiments, data storage 408 comprises resource location storage 414 for storing data associated with one or more resource and/or resource locations associated with a user and/or third party.

As illustrated in detail in FIG. 5, the environment 100 further includes one or more third party systems 140 which are connected to the user device 110, entity systems 120, and the encrypted data transmission system 130. The third party systems 140 may be associated with one or more users or customers of the encrypted data transmission system 130. The third party systems 140 generally comprise a communication device 502, a processing device 504, and a memory device 506 further comprising data storage 508. The third party systems 140 comprise computer-readable instructions 510 stored in the memory device 506, which in one embodiment includes the computer-readable instructions of a third party application 512. The third party systems 140 may communicate with the user device 110, entity systems 120, and the encrypted data transmission system 130 to provide access to accounts, resources, data (e.g., third party data 514) stored and maintained on the third party systems 140. In some embodiments, the third party system 140 may communicate with the encrypted data transmission system 130 during an interaction with a user 102 in real-time, wherein user interactions may be monitored and processed by the encrypted data transmission system 130. In some embodiments, data storage 408 comprises external data sources or database such as third party or external data 514 to either supplement or replace similar data storages or databases on the encrypted data transmission system 130 as previously discussed. In a specific embodiment, the third party system 140 is associated with a user who is a customer interacting with the encrypted data transmission system 130 to complete a resource transfer with another user.

The systems of the environment 100 may be used to provide a platform for selective data transmission as previously discussed. After receiving an initial resource transfer request, the system first determines an amount of data required to complete the resource transfers. The system then generates a customized data transmission package comprising a minimum amount of data required to complete a resource transfer between devices. The system is configured to remove or modify portions of the data transmitted to a destination device, wherein only the required data is transferred thereby enabling completion of the resource transfer. In some embodiments, removing or modifying portions of the data may include transforming portions of the data using encryption methods or a hash function. In a specific embodiment, the system may be configured to employ an additional, intermediary resource location to facilitate the resource transfer if the data requirements are not able to be met by either device.

FIG. 6 provides a high level process flow for generating a secure data tranmission, in accordance with one embodiment of the invention. As illustrated in block 610, the system first receives a request for a resource transfer of a resource from a user resource location (i.e., a source resource location) associated with a user to a destination device associated with a third party. As used herein, a resource transfer may refer to any transfer or exchange of resources (e.g., data or funds) between two or more users, parties, entities, or the like. In a specific embodiment, a resource transfer may be completed between a first user to a second user, wherein a resource is transferred from the first user to the second user in exchange for another resource, or a good or service. A resource transfer may comprise an electronic transfer of resources from a first user device associated with a first user to a second user device (i.e., a destination device) associated with a second user. In some embodiments, a resource transfer may be executed from a user device to another system associated with an entity such as a third party entity (e.g., third party system 140). During a resource transfer, a resource is transferred from a first user resource location to a second user resource location to complete the interaction. In addition to transferring the resource itself, a resource transfer further includes resource location data associated with one or more of the resource locations involved in the transfer. In some embodiments, resource location data is configured to identify a resource location and a user associated with said resource location. The system utilizes at least a portion of the resource location data to direct or route the resource to a recipient resource location associated with a destination device, to verify or authenticate the resource transfer, and generate a record of the resource transfer.

As previously discussed, conventional resource transfer systems for completing resource transfers between parties typically transmit or make available unnecessary amounts of extraneous data along with the resource transferred between the devices. This data may include personal, private, or secure identifying data that a user may prefer to remain secure and/or private while limiting exposure. What is more, this data is typically stored and maintained by the receiving device or party following the resource transfer which further increases potential exposure over time. As resource transfers are routinely required to be completed with unfamiliar and sometimes unknown and/or non-trusted third parties, there exists a need to limit exposure of potentially valuable and/or private data.

As a solution to this problem, as illustrated in block 620, the system determines a data requirement for completing the resource transfer. A data requirement is a minimum amount of user resource location data (e.g., user data and/or user account data) required for successfully directing or routing a resource from a user resource location to a destination device or destination resource location for completion of the resource transfer. In some embodiments, a data requirement is determined by a one or more of the users participating in the resource transfer. In one embodiment, the data requirement may be set by a recipient associated with the destination device to ensure successful completion of the resource transfer and delivery of the resource. In another embodiment, a user transferring the resource may set the data requirement, wherein the user selects data to include and/or data not to include (i.e., redacted or modified data) in the resource transfer. In this way, the user may control the data that is transmitted to the destination device. For example, the system may prompt the user via a user interface of a user application (e.g., user application 238) to select one or more portions of the data associated with the resource location to be included or, alternatively, portions to be redacted from the data (i.e., not to be included in the transfer). In yet another embodiment, a minimum data requirement may be set to comply with regulations set by a regulating entity for ensuring secure delivery of the resource. In some embodiments, one or more of the parties participating in the resource transfer must agree to the data requirements before the resource transfer is executed.

As illustrated in block 630, based on determining the data requirement, the system generates a data transmission package to transfer from a user device to a destination device. The system is configured to generate the data transmission package with a resource portion comprising the resource along with a data portion comprising the user resource location data gathered by the system for meeting the data requirement of the resource transfer and for directing the resource transfer. The system is configured to generate the data transmission package according to the determined data requirements, wherein only a minimum amount of data required to complete the resource transfer is included. As such, the system may remove or modify at least a portion of the user resource location data in the data transmission package. For example, a user may not wish to include data or information such as a phone number, address, email address, or other identifying data that might normally be sent to a third party during an interaction.

In one embodiment, the system may generate the transmission package using modified user resource location data, wherein the system removes portions of the data not required to complete resource transfer or otherwise specified by one or more users to not be included in the transfer. In another embodiment, the system is configured to apply a mask to the user resource location data, wherein at least a portion of the user resource location data is modified with additional or replacement data. The masked data may be provided to the destination device for meeting the data requirements, while maintaining data anonymity. The masked data may remain usable by the system for directing the resource transfer while masking at least those portions not required by the data requirements. In one embodiment, the masked data may be able to be reconstructed by the system but not by a destination device. In this way, the system may act as an intermediary, wherein the system may direct the resource transfer to the destination device and verify the authenticity of the resource transfer to the destination device without exposing at least a portion of the user data.

In some embodiments, the system is configured to generate a unique identifier for the user resource location. The unique identifier may be an anonymized or scrubbed identifier that may be used to identify a particular user resource location within the system (e.g. an alpha-numeric string). In a particular embodiment, the unique identifier is a one-time use token configured for use to only complete the resource transfer, wherein the token is not useable outside of the particular resource transfer. In one embodiment, the system generates the data transmission package as a one-time use token for a predetermined resource amount, wherein the token may be exchanged or redeemed for the value of the resource.

In one embodiment, the system further comprises an encryption function (e.g., encryption function 318) configured to encrypt at least a portion of the user resource location data to create a unique identifier for the user resource location. In another embodiment, the system includes a hash function (e.g., hash function 320) configured to generate a hash value. The hash function is configured to map data of a first size to a second fixed sized value that is typically smaller than the first size. The hash function may include one or more keys, tables, or the like for transforming and reading the data in the hashed format.

In one embodiment, the system may generate the data transmission package as an executable program, file, or code portion that is deliverable to the destination device and further comprises encoded instructions. The executable data transmission package, when received and executed by the destination device may cause a processor of the destination device to perform one or more tasks according to the encoded instructions. For example, when executed by the destination device, the data transmission package may be configured to reach back out to the system to receive the resource and complete the interaction. In one embodiment, the executable transmission package is an automated script. Alternatively, the data transmission package may comprise a non-executable data file.

As illustrated in block 640, the system delivers the transmission package to the destination device to complete the resource transfer. As the transmission package comprises the resource and the portion of the user resource location data that has been modified (e.g., at least partially removed or masked), the transmission package contains the necessary data to successfully complete the resource transfer.

As illustrated in block 650, the system may further be configured to verify an authentication request from the destination device after delivery of the transmission package. As only a limited portion of the data associated with the user and the user resource location are provided to the third party, the system provides authentication means to the third party for verifying resource transfers with the user. The system is configured to receive an authentication request from the destination device (i.e., third party) after delivery of the transmission package. As the third party may only be in possession of the unique identifier associated with the user, an authentication request may comprise the unique identifier to be provided back to the system for identification of the user within the system. The system may process the unique identifier to determine the associated user data and information. For example, the system may input the unique identifier into the encryption function 318 or hash function 320 to determine the user associated with the unique identifier. In another embodiment, the system may have a corresponding key portion for decrypting or demasking the unique identifier generated by the system.

In one embodiment, in response to receiving the authentication request, the system may further be configured to transmit an actionable notification to a user device associated with the user resource location requiring verification. The actionable notification is configured to receive confirmation input from the user via a user application for the resource transfer. For example, the actionable notification may comprise a text message or notification requesting a "yes" or "no" verification response from the user. The system may verify the authentication request based on receiving the confirmation input from the user, wherein verifying the authentication request completes the resource transfer. Alternatively, the system may stop a resource transfer in response to receiving a non-verification response (i.e., "no") from the user, wherein the system prevents the resource transfer from being completed. In one embodiment, the system may only send a portion of the transmission package to the destination device before the resource transfer is verified. For example, the system may only transmit the modified user resource location data in the transmission package without the resource. The system then sends the resource portion of the transmission package to the destination device only after the resource transfer has been verified.

In another embodiment, the system, and specifically the encryption function 318, is further configured to leverage homomorphic encryption methods, wherein the encrypted data may be directly processed or used in further calculations without being decrypted. Instead, the encrypted data may be processed to produce an encrypted result, wherein any of the processes performed on the encrypted data are carried through to the encrypted result. In this way, data processes for completing a resource transfer may be performed on the encrypted data without the need to decrypt and potentially expose the data at the receiving end (e.g., third party entity).

In an alternative embodiment, the system receives a selection of data for redaction from a user associated with a source device. The system is configured to determine whether the transmission package comprising the selection of redacted or otherwise modified data meets a previously defined data requirement for the resource transfer. Based on determining that the transmission package does not meet the data requirement, the system may be further configured to complete the resource transfer on behalf of the user, wherein the resource transfer is directed through an intermediary resource location (e.g., associated with an entity maintaining the system) to the destination device. For example, a user may select to not include any information in a resource transfer with a third party to be made available to a third party, as the third party is unfamiliar to or not trusted by the user. In response, the system may instead receive the resource transfer from the user resource location to the intermediary resource location. The resource may then be transferred from the intermediary resource location to the destination device and a destination resource location associated with the third party. In this way, the user only interacts with the trusted entity associated with the system and not the non-trusted third party, while the resource transfer may still be successfully completed with the third party. Furthermore, by injecting the intermediary resource location into the resource transfer path, the data associated with the user and the user resource location have limited or no exposure to the third party thereby maintaining security and privacy of the user data. The user resource location data is not transmitted from the intermediary resource location to the destination device.

In another embodiment, the system maintains a record of known and trusted users and entities as well as a record of non-trusted users and entities (e.g., stored in third party data records 316). The user and entity records may be based on historical interactions and misappropriation data or reports. Non-trusted users and entities are those users and entities associated with historical interactions involving suspected or confirmed misappropriation. In a specific embodiment, the system may be configured to automatically modify or remove user data from a data transmission package based on the status of a user or entity associated with a destination device. For example, in response to identifying that a third party associated with a destination device is associated with misappropriation and is a non-trusted entity, the system may automatically remove or modify one or more portions of the transmitted user data based on the entity record of the third party. In some embodiments, the system may generate and store transmission templates for trusted and non-trusted users and entities based on the data to be included in a transmission package.

Furthermore, a record of trusted users and entities may comprise those users and entities having a predetermined number of approved or authenticated successful resource transfers according to the historical interaction records. In one embodiment, a user may be indicated as a trusted user in the system based on historical interactions records, wherein the system requires a smaller amount of data from the user to authenticate and complete a resource transfer. Similarly, an entity may be a trusted entity, wherein the system requires a smaller amount of data from the entity to authenticate and complete a resource transfer. In another embodiment, a trusted entity may have a data security and privacy policy agreeable to data privacy concerns of a user (i.e., matching data security and privacy requirements), wherein the system may automatically complete the resource transfer without needing to request user selection of data for inclusion in the transmission package.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with generating encrypted data transmissions for secure resource distributions.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a hard disk, a random access memory (RAM), and/or some other tangible optical and/or magnetic storage device. In other embodiments of the present invention, however, the computer-readable medium may be transitory, such as a propagation signal including computer-executable program code portions embodied therein.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for generating encrypted data transmissions for secure resource distributions, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A privacy-enabled system for securely transmitting encrypted data, the system comprising:
    a memory device with computer-readable program code stored thereon;
    a communication device connected to a network; and
    a processing device, wherein the processing device is configured to execute the computer-readable program code to:
        receive a request for a resource transfer of a resource from a user resource location associated with a user to a destination device associated with a third party;
        determine a data requirement for completing the resource transfer, wherein the data requirement is a minimum amount of user resource location data required for directing the resource from the user resource location to the destination device and completing the resource transfer;
        based on determining the data requirement, generate a transmission package comprising the resource, wherein the transmission package has at least a portion of the user resource location data removed or modified, wherein generating the transmission package comprises generating a unique identifier for the user resource location to at least partially mask the user resource location data from the destination device, and wherein the unique identifier is configured to be provided to the destination device with the resource to complete the resource transfer;
        deliver the transmission package to the destination device to complete the resource transfer;
        receive an authentication request from the destination device after delivery of the transmission package, the authentication request comprising the unique identifier;
        in response to receiving the authentication request, transmit an actionable notification to a user device associated with the user resource location, the actionable notification configured to receive confirmation input from the user via a user application for the resource transfer; and
        verify the authentication request based on receiving the confirmation input from the user, wherein verifying the authentication request completes the resource transfer.

2. The system of claim 1, wherein the user is associated with the user device, and wherein the processing device is further configured to execute the computer-readable program code to: receive from the user, via the user application, a selection of redacted data from the user resource location data to be removed from or modified in the transmission package.

3. The system of claim 2 further comprising an intermediary resource location, wherein the processing device is further configured to execute the computer-readable program code to:
    determine whether the transmission package comprising the selection of redacted data meets the data requirement; and based on determining that the transmission package does not meet the data requirement, complete the resource transfer on behalf of the user, wherein the resource transfer is directed through the intermediary resource location to the destination device.

4. The system of claim 3, wherein the user resource location data is not transmitted from the intermediary resource location to the destination device.

5. The system of claim 1, wherein the unique identifier is a one-time use token configured to only be used to complete the resource transfer.

6. The system of claim 1, further comprising an encryption function stored in the memory device, the encryption function being configured to generate the unique identifier as an encrypted or hashed output.

7. The system of claim 1, wherein generating the transmission package comprises generating the transmission package as a one-time use token for a predetermined resource amount, wherein the one-time use token may be exchanged or redeemed for a value of the resource.

8. A computer program product for securely transmitting encrypted data, wherein the computer program product comprises a non-transitory computer-readable medium comprising computer-readable instructions, the computer-readable instructions, when executed by a processing device, cause the processing device to:
receive a request for a resource transfer of a resource from a user resource location associated with a user to a destination device associated with a third party;
determine a data requirement for completing the resource transfer, wherein the data requirement is a minimum amount of user resource location data required for directing the resource from the user resource location to the destination device and completing the resource transfer;
based on determining the data requirement, generate a transmission package comprising the resource, wherein the transmission package has at least a portion of the user resource location data removed or modified, wherein generating the transmission package comprises generating a unique identifier for the user resource location to at least partially mask the user resource location data from the destination device, and wherein the unique identifier is configured to be provided to the destination device with the resource to complete the resource transfer;
deliver the transmission package to the destination device to complete the resource transfer;
receive an authentication request from the destination device after delivery of the transmission package, the authentication request comprising the unique identifier;
in response to receiving the authentication request, transmit an actionable notification to a user device associated with the user resource location, the actionable notification configured to receive confirmation input from the user via a user application for the resource transfer; and
verify the authentication request based on receiving the confirmation input from the user, wherein verifying the authentication request completes the resource transfer.

9. The computer program product of claim 8, wherein the user is associated with the user device, and wherein the computer-readable instructions, when executed by the processing device, further cause the processing device to:
receive from the user, via the user application, a selection of redacted data from the user resource location data to be removed from or modified in the transmission package.

10. The computer program product of claim 9 further comprising an intermediary resource location, wherein the computer-readable instructions, when executed by the processing device, further cause the processing device to:
determine whether the transmission package comprising the selection of redacted data meets the data requirement; and
based on determining that the transmission package does not meet the data requirement, complete the resource transfer on behalf of the user, wherein the resource transfer is directed through the intermediary resource location to the destination device.

11. The computer program product of claim 10, wherein the user resource location data is not transmitted from the intermediary resource location to the destination device.

12. The computer program product of claim 8 wherein the unique identifier is a one-time use token configured to only be used to complete the resource transfer.

13. The computer program product of claim 8, further comprising an encryption function stored in a memory, the encryption function being configured to generate the unique identifier as an encrypted or hashed output.

14. The computer program product of claim 8, wherein the computer-readable instructions, when executed by the processing device, further cause the processing device to, when generating the transmission package, generate the transmission package as a one-time use token for a predetermined resource amount, wherein the one-time use token may be exchanged or redeemed for a value of the resource.

15. A computer-implemented method for securely transmitting encrypted data, the computer-implemented method comprising:
receiving a request for a resource transfer of a resource from a user resource location associated with a user to a destination device associated with a third party;
determining a data requirement for completing the resource transfer, wherein the data requirement is a minimum amount of user resource location data required for directing the resource from the user resource location to the destination device and completing the resource transfer;
based on determining the data requirement, generating a transmission package comprising the resource, wherein the transmission package has at least a portion of the user resource location data removed or modified, wherein generating the transmission package comprises generating a unique identifier for the user resource location to at least partially mask the user resource location data from the destination device, and wherein the unique identifier is configured to be provided to the destination device with the resource to complete the resource transfer;
delivering the transmission package to the destination device to complete the resource transfer;
receiving an authentication request from the destination device after delivery of the transmission package, the authentication request comprising the unique identifier;
in response to receiving the authentication request, transmitting an actionable notification to a user device associated with the user resource location, the actionable notification configured to receive confirmation input from the user via a user application for the resource transfer; and
verifying the authentication request based on receiving the confirmation input from the user, wherein verifying the authentication request completes the resource transfer.

16. The computer-implemented method of claim 15, wherein the user is associated with the user device, the computer-implemented method further comprising: receiving from the user, via the user application, a selection of redacted data from the user resource location data to be removed from or modified in the transmission package.

17. The computer-implemented method of claim 16 further comprising:
  determining whether the transmission package comprising the selection of redacted data meets the data requirement; and
  based on determining that the transmission package does not meet the data requirement, completing the resource transfer on behalf of the user, wherein the resource transfer is directed through an intermediary resource location to the destination device.

18. The computer-implemented method of claim 17, wherein the user resource location data is not transmitted from the intermediary resource location to the destination device.

19. The computer-implemented method of claim 16, wherein the unique identifier is a one-time use token configured to only be used to complete the resource transfer.

20. The computer-implemented method of claim 16, comprising generating, with an encryption function, the unique identifier as an encrypted or hashed output.

* * * * *